March 12, 1957  D. J. DONAHUE  2,785,331
ART OF MAKING COLOR-PHOSPHOR SCREENS
Filed Aug. 24, 1953
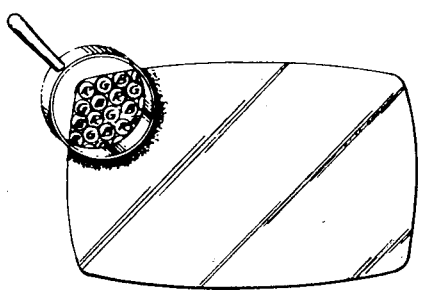
*Fig_1*
G = GREEN-PHOSPHOR, 1-MICRON AVERAGE PARTICLE SIZE.
B = BLUE-PHOSPHOR, 2-MICRONS AVERAGE PARTICLE SIZE.
R = RED-PHOSPHOR, 3-4 MICRONS AVERAGE PARTICLE SIZE.
A = ADHESIVE.
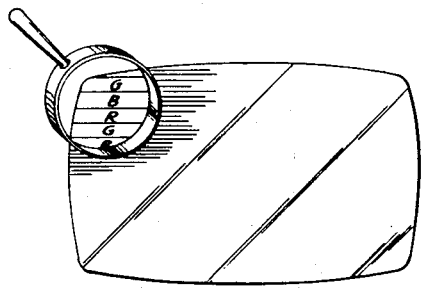
*Fig_2*
*Fig_3*
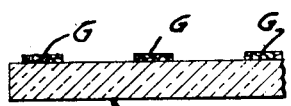
(SCREEN PLATE)
*Fig_4*
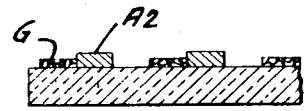
*Fig_5*
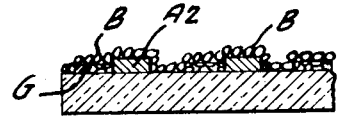
*Fig_6*
*Fig_7*
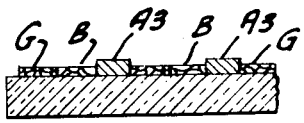
*Fig_8*
*Fig_9*
*Fig_10*
INVENTOR.
Daniel J. Donahue
BY Roderick Maledon
ATTORNEY

2,785,331
ART OF MAKING COLOR-PHOSPHOR SCREENS

Daniel J. Donahue, Lancaster, Pa., assignor to Radio Corporation of America, a corporation of Delaware Application August 24, 1953, Serial No. 375,874

6 Claims. (Cl. 313—92)

This invention relates to improvements in the art of making color-phosphor screens for use in tri-color-kinescopes, etc.

In the conventional "dusting method" sometimes used in making color-television screens, a tacky material is laid down in the desired fractional ("dot" or "line") pattern on a glass screen-plate in any convenient way, such, for example, with the aid of a stencil, or a "silk-screen" or by means of a printing plate. Phosphor particles of one color-response characteristic are then sprayed onto or permitted to settle upon the plate and brushed, as with a piece of cotton, to remove excess particles and to cause the useful particles to adhere to the tacky material. Next, the plate is heated for a short time to evaporate the solvent in the tacky material and thus to bond the remaining phosphor particles to the surface of the plate. At this stage of the process the spaces between the phosphor dots or lines are blank and clean and ready to receive the next tacky pattern of dots or lines. The other color or colors are deposited on the screen-plate in the same sequence of steps, i. e., (1) laying down the tacky material in the desired pattern, (2) "dusting on" the color-phosphor particles, (3) removing the excess particles, and (4) "setting" the tacky material.

Up to now, color-phosphor screens made by the above-described conventional dusting technique have invariably exhibited some noticeable degree of "color contamination." Experiments have demonstrated that this is so because, in dusting-on the second color-phosphor, some of the particles of said phosphor are deposited upon and adhere to the dot-like or line-like areas already occupied by the first phosphor. Likewise, some of the third color-phosphor particles may be deposited upon and adhere to the surface of the pattern formed by the first and second phophors.

Accordingly, the principal object of the present invention is to provide an improved "dusting method" of making color-phosphor screens and the like, and one which shall provide a color-screen characterized by its substantial freedom from color-contamination resulting from the undesired intermingling of the particles of one color with the particles of the other color or colors.

Another and important object of the invention is to achieve the foregoing principal object in a manner so simple that it shall require no additional dexterity or skill on the part of the person entrusted with the actual printing and dusting operations.

Stated generally, the foregoing and related objects are achieved in accordance with the invention by making the different color-phosphors of different average particle size and then laying down the different colors in the rising order of their particle size, i. e., dusting-on the phosphor having the smallest particle size first, the next larger particles second, and so on. The advantage of this procedure may be accounted for by the fact that the particles of the smallest size form on the adhesive a coating which is substantially impervious to the particles of larger sizes. Hence, the particles of the larger sizes cannot become "anchored" to or wedged between the particles of smaller sizes; nor can they stick to the adhesive by which said smaller particles are bonded to the screen-plate. Maximum freedom from color-contamination is ensured by taking advantage of the relative efficiencies of the different color-phosphor materials and of the fact that the eye is more sensitive to some colors than to other colors. That is to say, it is preferable to assign the smallest particle-dimensions to the color-phosphor of maximum sensitivity; the next larger particle-size to the color-phosphor of the next order of sensitivity, and so forth. Thus, should some few of the later applied, larger size, less sensitive particles adhere to the previously applied smaller-size more-sensitive particles then the color-response of the less-sensitive phosphor will be "blanketed" by the color-response of the more sensitive phosphor.

The invention is described in greater detail in connection with the accompanying single sheet of drawings, wherein:

Fig. 1 is a plan view, as viewed through a magnifying glass, of a part of the electron-sensitive target surface of a tri-color phosphor-screen of the so-called "dot-screen" variety; the (hexagonal) pattern of color-dots being similar to one shown in Schroeder 2,595,548;

Fig. 2 is a view similar to Fig. 1 but showing a tri-color-phosphor target of the "line-screen" variety; the screen being suitable for use in the color-kinescopes of French Patent 866,065 (1941), for example; and Figs. 3 to 10 inclusive are fragmentary side-elevational views of the color-screen of Fig. 2 during successive stages of its manufacture by the method of the present invention.

In applying the invention to the manufacture of a tri-color-phosphor screen of the "dot-screen" variety, shown in Fig. 1, or the "line-screen" variety shown in Figs. 2–10, the red (R), blue (B) and green (G) sub-elemental dot-like or line-like target areas may be composed of any of several suitable phosphor materials. Thus, as disclosed in Leverenz 2,310,863 the "red" phosphor may comprise chromium-activated aluminum berylliate or zinc sulfide activated by silver; the "blue" phosphor: silver-activated zinc sulfide, zinc sulfide, zinc silicate and zirconium silicate; and the "green" phosphor may comprise: alpha-willemite activated with maganese or zinc cadmium sulfide activated with silver. It is preferable, however, to employ phosphor materials of more uniform "color-saturation" properties than the materials above mentioned. Such a group of color-phosphors is disclosed by Leverenz in U. S. Patent No. 2,757,304. The color-phosphor materials in this group are now commercially available (from RCA Mfg. Co., Camden, N. J.) under the following identifying symbols and in the following approximate average-particle sizes.

| Color | Symbol | Material | Particle Size, microns |
|---|---|---|---|
| Green | 33-W-2B | zinc-silicate, containing about 0.1 to 1% by weight of manganese activator. | 1 |
| Blue | 33-Z-256 | zinc sulfide, or zinc selino-sulfide, silver activator. | 2 |
| Red | 33-Z-267 | zinc selenide and zinc-cadmium selenide, copper activator. | 3-4 |

Another group of color phosphors which has proven satisfactory, comprises:

| Color | Symbol | Material | Particle Size, microns |
|---|---|---|---|
| Green | 33-W-254 | zinc silicate, manganese activator (short persistence). | 1 |
| Blue | 33-Z-265 | pure zinc sulfide, silver activator | 2 |
| Red | 33-Z-639 | zinc phosphate, manganese activator. | 4 |

Of the three primary colors (red, blue and green) the eye is most sensitive to green. Hence, in carrying the invention into effect the smallest average particle size is assigned to the green-phosphor. Accordingly, the green-phosphor is the first to be laid down on the adhesive material. This is indicated in Fig. 3 of the drawings which shows the tri-color-television "line-screen" of Fig. 2 at that stage of its manufacture whereas an adhesive material A1 is printed on the target surface of the glass screen-plate P in the pattern of the "green" lines only, and covered all over with the fine particles G of the green-phosphor. Fig. 4 shows the glass-plate P of Fig. 3 after the excess green-phosphor particles have been removed therefrom, and the phosphor-covered adhesive has been brushed to embed the useful particles therein. As in the conventional "dusting" method (previously described) the glass plate is next heated to evaporate the solvent in the tacky material so that the embedded green-phosphor particles are firmly bonded to the glass. In the instant case these very fine particles form a homogeneous continuous coating on the glass which is impervious to the larger particles of which the other, later applied, phosphor materials are comprised.

Referring to Fig. 5: After the glass has cooled the next array of tacky areas A2 is laid down in the spaces between the green phosphor coated areas G on the plate for the reception of the next larger (blue phosphor) particles. As indicated in Fig. 6 some of the blue-phosphor particles B settle upon the previously formed green-phosphor coated areas G but since said areas are made up of particles of very small size and hence are relatively smooth, the larger (blue-phosphor) particles can easily be brushed off without becoming "snagged" or anchored on the green-particle areas. When the excess blue-phosphor has been removed from the green-areas, and from the bare glass between the blue and green areas, the plate is again heated, this time to evaporate the solvent and to "set" the adhesive underlying the blue-phosphor areas B; all as indicated in Fig. 7.

When, as in the instant case, the screen-plate is to comprise all three of the primary colors, the largest size particles, in this case the red-phosphor R, are the last to be laid down. As before, this involves laying down the adhesive A3 (Fig. 8) between the green (G) and blue (B) areas; dusting-on the phosphor and removing the excess (Fig. 9), and finally heating the plate to drive off the solvent in the tacky material A3 and thus to bond the red particles R to the glass. The finished tri-color phosphor screen is shown in Fig. 10.

In conclusion it should be mentioned that instances have occurred in the practice of the invention wherein the blue field in some screens exhibited a discernible degree of green contamination. Upon close examination it was noticed that the contaminated areas did not have the same color response characteristic as the green phosphor and thus could not be attributed to any commingling of the green and blue phosphor-particles. A spectrographic analysis showed traces of twelve metals in the tacky material. Among these were copper, iron, and nickel which are known to contaminate the blue-phosphor, 33–Z–256. Accordingly, it is recommended that only metal-free adhesive materials, such, for example, as clean ethyl cellulose or the acrylate resins, and suitably clean solvents therefor be employed wherever optimum freedom from color-contamination is required.

What is claimed is:

1. Method of making a color-phosphor screen of the mosaic variety, said method comprising; assigning different phosphor-particle sizes to the different color-phosphors of which the elemental areas of said mosaic screen are to be formed, and then separately laying down said color-phosphors in the desired mosaic pattern on the target surface of a screen-plate in a sequence corresponding to the increasing order of said different phosphor-particle sizes.

2. Method of making a primary-color phosphor-screen of the mosaic variety, said method comprising; assigning to the different primary-color phosphors of said mosaic different phosphor-particle sizes of an order corresponding to the inverse order of maximum sensitivity of the human eye to primary colors, and then separately laying down said different color-phosphors in the desired mosaic pattern on a screen plate in a sequence corresponding to said inverse order of maximum sensitivity.

3. The method of claim 2 as applied to the manufacture of a green-blue-red mosaic phosphor screen and wherein the average phosphor-particle size assigned to the green-phosphor is about one-micron in diameter, the average particle-size assigned to the blue-phosphor is about two-microns in diameter and the average particle size assigned to the red-phosphor is of the order of about three to four microns in diameter.

4. Method of providing a screen-plate with a phosphor-coated mosaic target-surface made up of a multiplicity of substantially duplicate groups of sub-elemental target areas of different color-response characteristics, said method comprising; assigning different phosphor-particle sizes to respectively different ones of the color-phosphors with which the sub-elemental target areas of said mosaic are to be coated and then applying said different color-phosphors to corresponding ones of the sub-elemental target areas of said mosaic in each of said groups in a sequence corresponding to the order of said different phosphor-particle sizes.

5. Method of providing a screen-plate with a phosphor-coated mosaic target-surface made up of a multiplicity of substantially duplicate groups of sub-elemental target areas of different color-response characteristics, said method comprising; assigning different average-particle sizes to the different color-phosphors of which said mosaic target surface is to be formed, applying a tacky bonding material to said surface in a pattern corresponding to the pattern of sub-elemental target-areas of the color-phosphor to which the smallest of said particle-sizes has been assigned, dusting an excess quantity of said smallest particles onto said screen-plate whereby said particles completely cover and adhere to said tacky sub-elemental target areas, removing the excess of said particles from said surface, heating said plate to bond said phosphor covered pattern to said surface, and then repeating said steps to apply the other of said color-phosphors to said plate in the increasing order of their particle sizes.

6. A color-television screen comprising a screen-plate having a multiplicity of systematically arranged, substantially duplicate groups of sub-elemental areas of different primary color-response characteristics on a target surface thereof, said sub-elemental areas being constituted of green, blue and red phosphor materials of respectively different particle sizes of a relative order corresponding to the inverse order of maximum sensitivity of the human eye to said primary colors.

References Cited in the file of this patent
UNITED STATES PATENTS

| | | |
|---|---|---|
| 2,310,863 | Leverenz | Feb. 9, 1943 |
| 2,452,522 | Leverenz | Oct. 26, 1948 |
| 2,475,330 | Levy | July 5, 1949 |
| 2,543,477 | Sziklai et al. | Feb. 27, 1951 |
| 2,590,018 | Koller et al. | Mar. 18, 1952 |
| 2,625,734 | Law | Jan. 20, 1953 |